United States Patent
Pavan et al.

(10) Patent No.: US 10,717,602 B2
(45) Date of Patent: Jul. 21, 2020

(54) CONVEYOR TO TRANSPORT ROLLS OF MEMBRANE BASE OF BITUMEN

(71) Applicant: Euroline S.r.l., Maserada sul Piave (IT)

(72) Inventors: Alessandro Pavan, Maserada sul Piave (IT); Antonio Fornasier, Maserada sul Piave (IT)

(73) Assignee: Euroline S.r.l., Maserada sul Piave (IT)

(*) Notice: Subject to any disclaimer, the term of this patent is extended or adjusted under 35 U.S.C. 154(b) by 0 days.

(21) Appl. No.: 16/290,829

(22) Filed: Mar. 1, 2019

(65) Prior Publication Data

US 2019/0270593 A1  Sep. 5, 2019

(30) Foreign Application Priority Data

Mar. 2, 2018 (IT) .......................... 102018000003240

(51) Int. Cl.
   *B65G 17/04* (2006.01)
   *B65G 17/12* (2006.01)
   *B65G 17/36* (2006.01)

(52) U.S. Cl.
   CPC ............. *B65G 17/04* (2013.01); *B65G 17/12* (2013.01); *B65G 17/36* (2013.01); *B65G 2201/0232* (2013.01)

(58) Field of Classification Search
   CPC ...... B65G 17/04; B65G 17/12; B65G 17/126; B65G 17/14; B65G 17/36; B65G 2201/0232
   See application file for complete search history.

(56) References Cited

U.S. PATENT DOCUMENTS

| 3,788,453 A | * | 1/1974 | Varney | ...................... A23N 3/00 198/715 |
| 4,501,350 A | * | 2/1985 | Muller | .................. B65B 25/046 198/477.1 |

(Continued)

FOREIGN PATENT DOCUMENTS

| DE | 19506970 A1 | * | 8/1996 | ............... A21C 9/08 |
| DE | 19506970 A1 | | 8/1996 | |

(Continued)

OTHER PUBLICATIONS

Search Report for Italian Patent Application No. 102018000003240 dated Nov. 15, 2018.

*Primary Examiner* — Gene O Crawford
*Assistant Examiner* — Keith R Campbell
(74) *Attorney, Agent, or Firm* — Womble Bond Dickinson (US) LLP

(57) ABSTRACT

A roll transporting conveyor for transporting bituminous membrane rolls along a feeding direction. The roll transporting conveyor comprises: a support frame provided with two beams spaced apart from each other and parallel to said feeding direction; two driving belts arranged at the respective beams; a plurality of crossbars extending in a bridge-like manner between a driving belt and the other at a preset distance along said feeding direction and having the opposite axial ends integral to the driving belts; a plurality of belt-shaped transport portions, each of which extends between two consecutive crossbars and is sized to form a hammock-shaped transport cradle having an approximately semi-cylindrical shape for holding a roll between two consecutive crossbars.

18 Claims, 5 Drawing Sheets

(56) References Cited

U.S. PATENT DOCUMENTS 5,766,729 A * 6/1998 Zanchetta ................ D06N 5/00
428/143
2019/0136942 A1* 5/2019 Dalgaard-Nielsen ........................
B65G 17/36

FOREIGN PATENT DOCUMENTS

| EP | 0243268 A1 * | 10/1987 | ............. B65G 17/04 |
| EP | 0243268 A1 | 10/1987 | |
| EP | 0273105 A1 | 7/1988 | |

* cited by examiner

CONVEYOR TO TRANSPORT ROLLS OF MEMBRANE BASE OF BITUMEN

CROSS-REFERENCE TO RELATED APPLICATIONS

This patent application claims priority from Italian Patent Application No. 102018000003240 filed on Mar. 2, 2018, the entire disclosure of which is incorporated herein by reference.

TECHNICAL FIELD

The present invention relates to a conveyor for transporting bituminous membrane rolls.

In particular, the present invention relates to a roll transporting conveyor formed by rolled bituminous membranes to convey a succession of rolls between two successive work stations of a bituminous membrane production plant; use to which the following discussion will explicitly refer without thereby losing its generality.

BACKGROUND ART

It is known that the plants for the production of bituminous membrane rolls comprise in the end part of the roll production line: a roll forming station that receives a flat bituminous belt and winds it around a winding axis to form the finished membrane roll, and a palletization station that receives the finished bituminous membrane rolls and arranges them in ordered, parallel and adjacent positions, ready for the packaging.

Generally, in the aforesaid plants, the movement of the bituminous membrane rolls from the roll forming station to the palletization station is carried out through a conveyor. The conveyor comprises a support frame, a belt looped about rollers rotatably pivoted on the frame, and a handling assembly that rotates the rollers so as to advance the upper branch of the roll supporting and transporting belt towards a preset feeding direction.

In the known conveyors described above, the belt is made of a high-hardness rigid rubber, is seamlessly wound to form a closed loop and is kept stretched between the rollers to form on the upper transport branch a flat and rigid roll transport surface.

In the plants described above it happens that, in use, the rolls arranged on the transport surface of the upper branch of the belt tend to become remarkably oval during the advancement. In fact, when the roll is laid on the flat and rigid supporting surface of the belt, it is not completely cooled but is still partially soft because it still has a remarkably high temperature. Since it is not completely rigid, the roll tends both to deform in its lower supporting surface portion, which partially tends to flatten against the flat and rigid conveyor surface of the belt, and to be compressed, due to the weight force, towards the same, thus remarkably altering its original cylindrical section obtained in the roll forming station. Furthermore, studies carried out by the Applicant have shown that the oval effect also depends on the ambient temperature and on the bituminous compound used. In particular, it has been found that the deformation is enhanced both in the summer season and when the membrane mixture is made of particularly "soft" materials, such as styrene-butadiene-styrene.

The ovalization of the roll determines various problems. First, an oval roll is subject to instability problems when it is arranged vertically alongside other rolls during the palletization operation. Moreover, the oval roll is inconvenient for the installer, since during its application on flat surfaces, for example roofs, its not perfectly circular shape makes it hop, thus causing some improper misalignments with respect to the expected position.

The Applicant has therefore conducted an in-depth study aimed at identifying a conveyor that is able to transport the rolls of bituminous membrane without causing their ovalization.

DISCLOSURE OF INVENTION

The object of the present invention is therefore to provide a solution that allows achieving the aforesaid object.

This object is achieved by the present invention in that it relates to a conveyor for transporting bituminous membrane rolls according to what stated in the appended claims.

BRIEF DESCRIPTION OF THE DRAWINGS

The present invention will now be described with reference to the appended drawings showing a non-limiting embodiment, in which.

BEST MODE FOR CARRYING OUT THE INVENTION

The present invention will now be described in detail with reference to the attached figures to allow a person skilled in the art to make and use it. Various modifications to the described embodiments will be immediately apparent to the persons skilled in the art and the generic principles described can be applied to other embodiments and applications without departing from the protective scope of the present invention, as defined in the attached claims. Therefore, the present invention should not be considered limited to the described and shown embodiments, but it must be granted the broadest protection scope in accordance with the principles and characteristics described and claimed herein.

Figure 1:
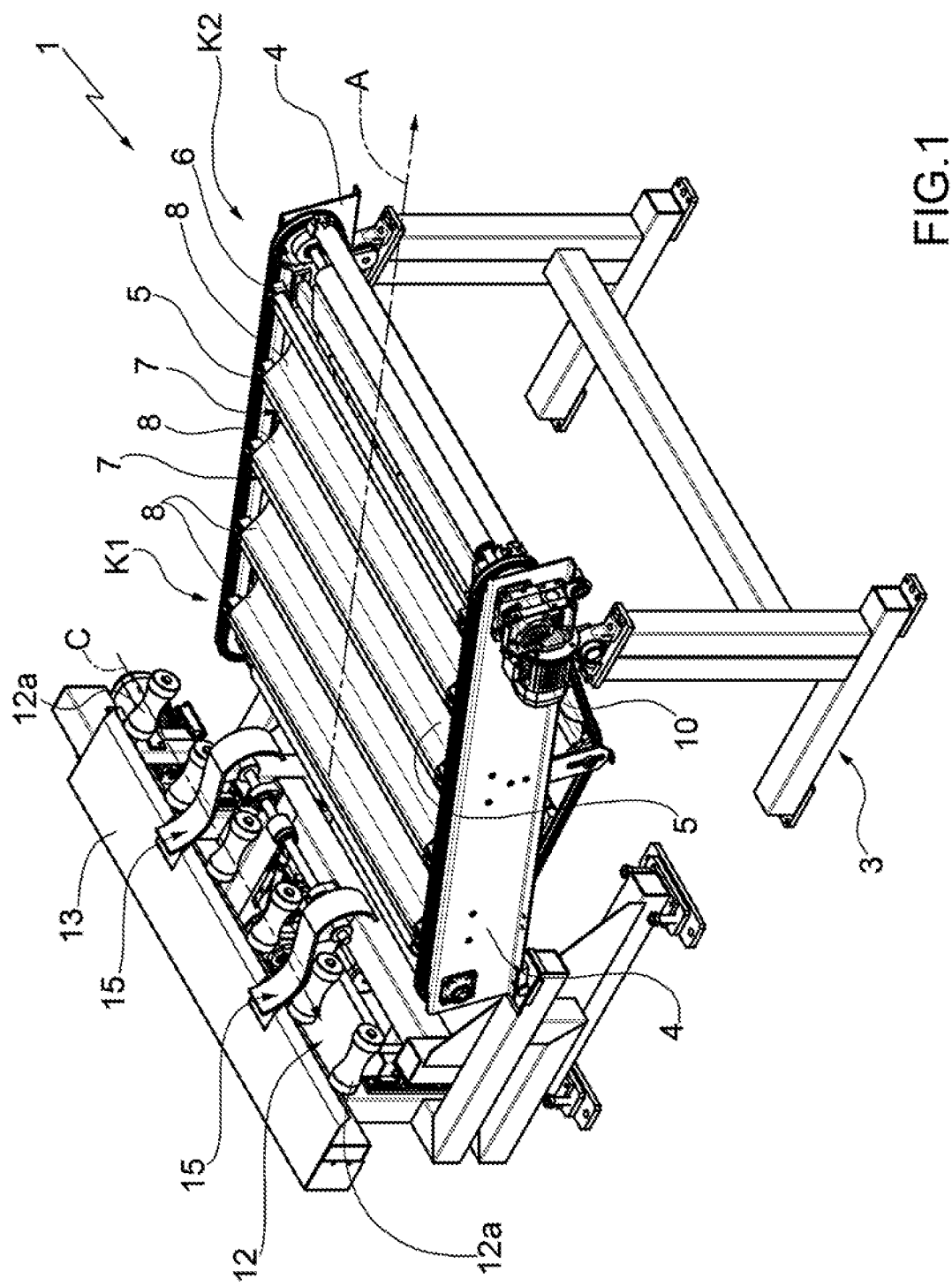
FIG. 1 is a perspective view of a conveyor for transporting bituminous membrane rolls made according to the dictates of the present invention.
Figure 2:
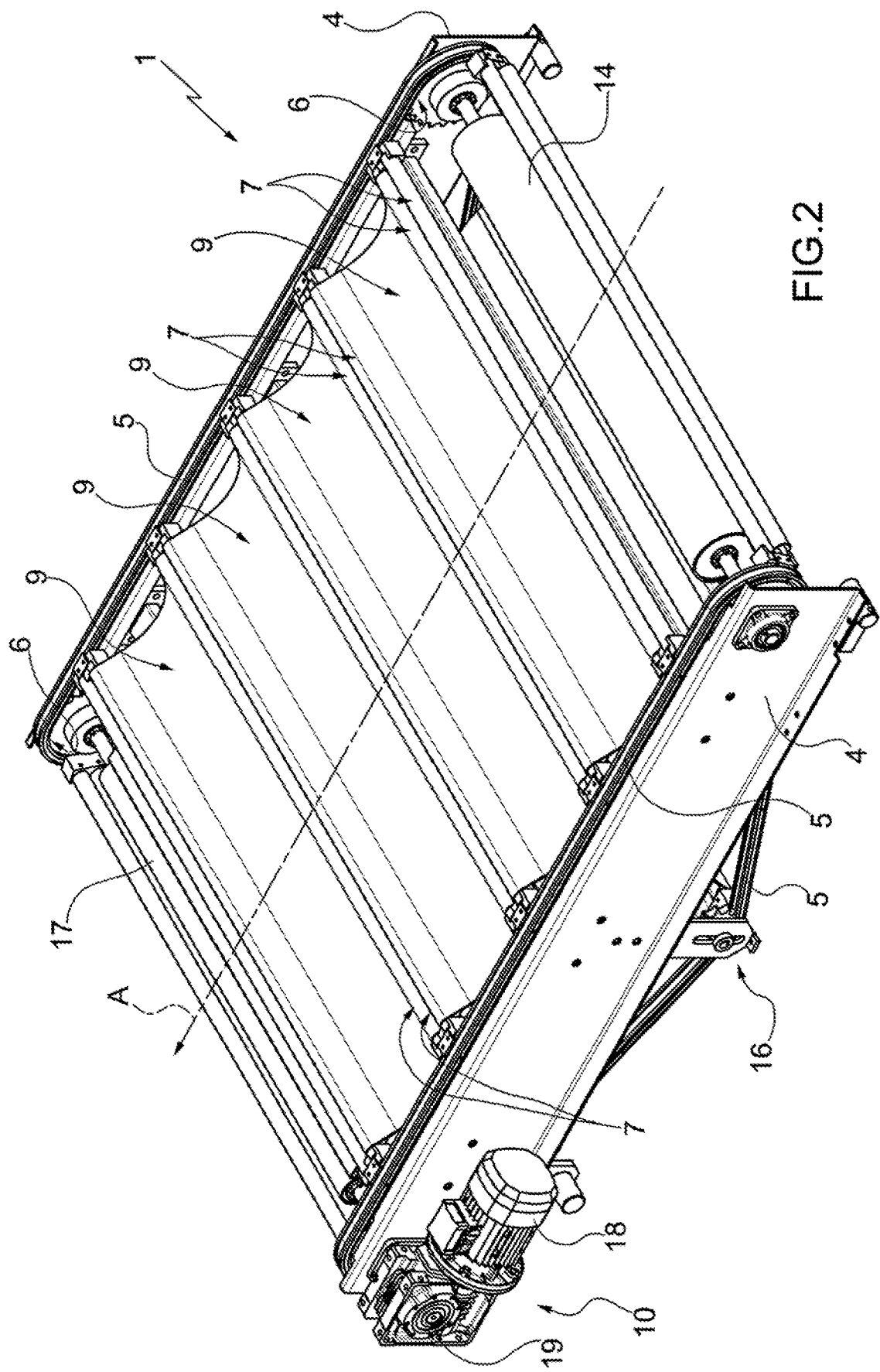
FIG. 2 is a perspective view on an enlarged scale with parts removed for clarity's sake of the conveyor shown in FIG. 1.
Figure 3:
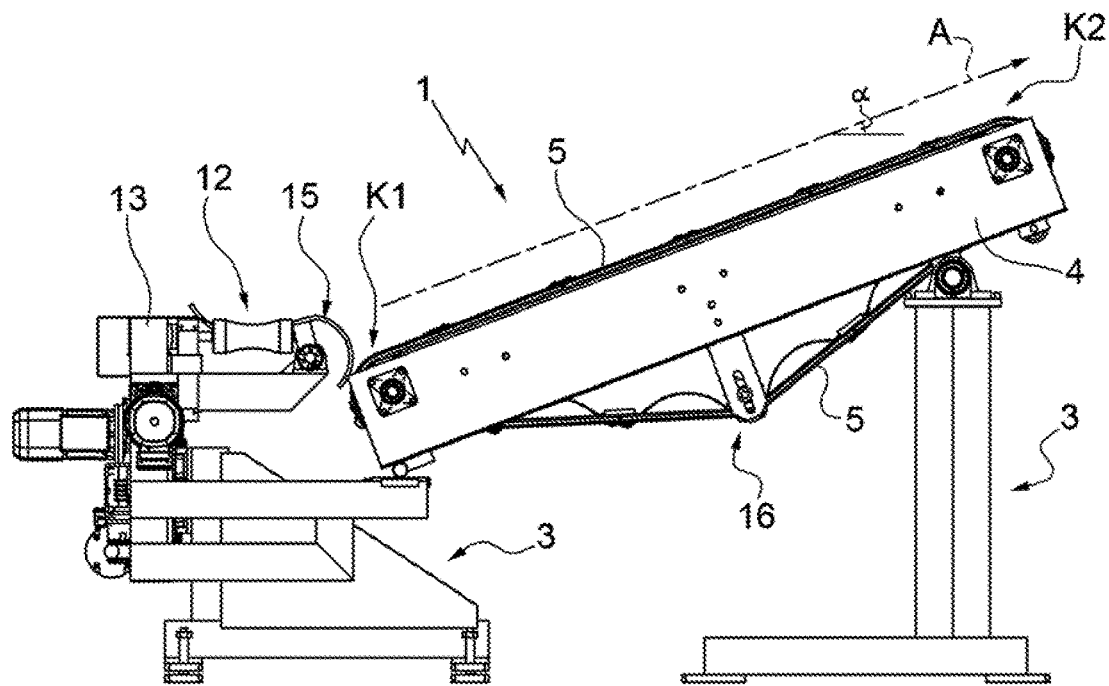
FIG. 3 is a side elevation view of the conveyor shown in FIG. 1.
Figure 4:
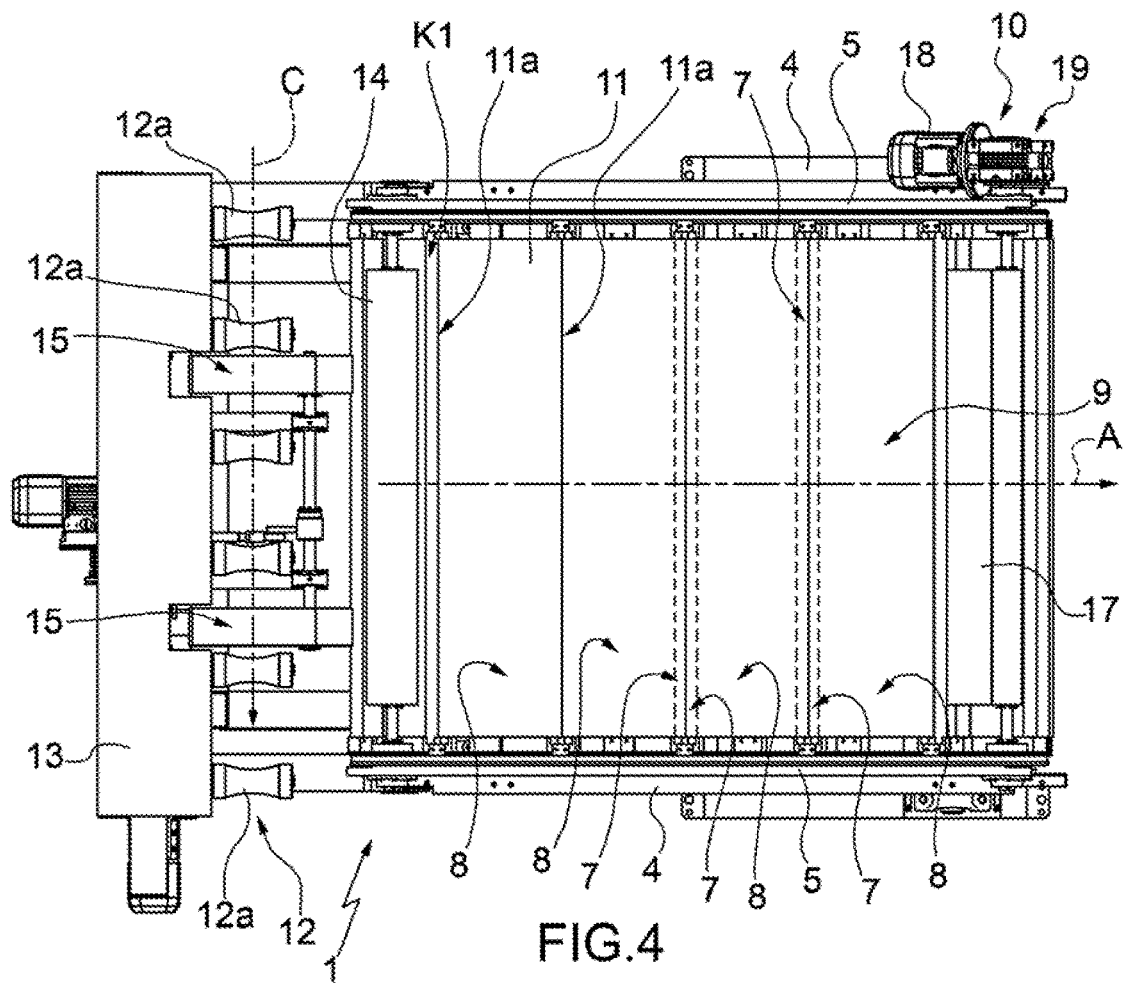
FIG. 4 is a plan view of the conveyor shown in FIG. 1.
Figure 5:
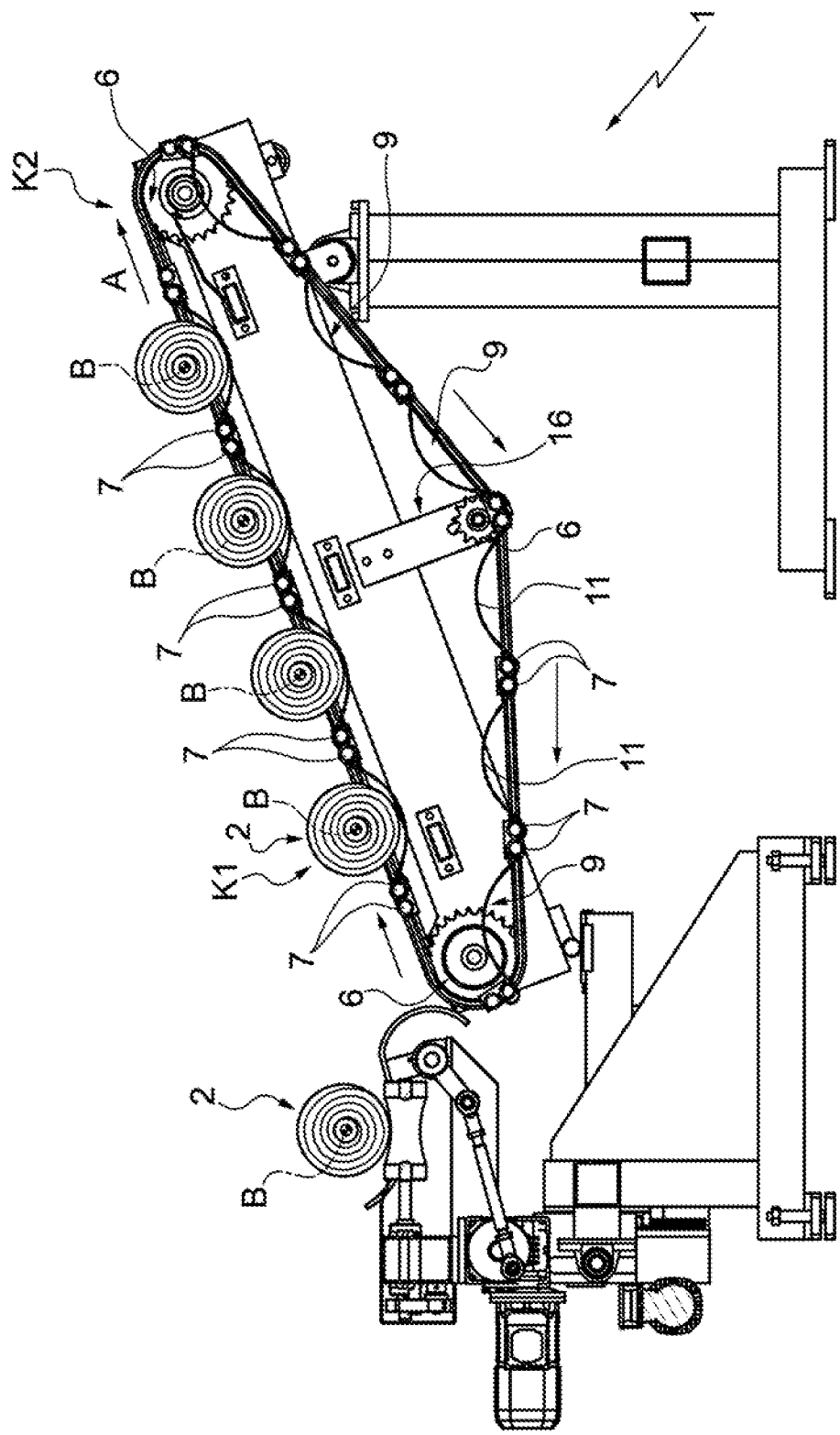
FIG. 5 is a longitudinal section of the conveyor shown in FIG. 1 in an operating condition where it makes some rolls advance.

With reference to FIG. 1, the number 1 indicates as a whole a roll transporting conveyor configured to transport bituminous membrane rolls 2 (schematically shown in FIGS. 5 and 6) along a preset feeding direction A between a first end corresponding to a loading station K1, in which the roll transporting conveyor 1 receives the rolls 2, and a second end opposite the first and corresponding to an unloading station K2, in which the roll transporting conveyor 1 unloads the rolls 2.

It is clear that a "membrane" is a preferably multi-layered flat structure having a preset width based on a bituminous compound. Preferably, the bituminous mixture can comprise for example: at least one central support layer, which is made by a central belt or film made of flexible paper or plastic material or fabric or any similar flexible material, and at least two bituminous layers, namely a lower and an upper layer, fastened to respective main lower and upper surfaces, opposite each other, of the central support layer so as to entrap/embed stably the central support layer. Preferably, the roll forming membrane 2 can be belt-shaped/laminated and is sized so that it can be wound about an axis B to form the roll 2 (reel). Preferably, the bituminous membrane rolls 2 carried by the conveyor 1 object of the present invention find a preferred and convenient application in the building field to make waterproofing and/or sealing layers, preferably but not necessarily for covering roofs and/or any part of building structures.

It is also clear that "bituminous compound" means a mixture or compound based on natural hydrocarbons or remnants deriving from the distillation or refining of petroleum and mixed in a known way and therefore not described in detail (forming tar, asphalt or in general a mixture of high viscosity hydrocarbons), to which a certain amount of polymeric material is preferably but not necessarily added. The polymeric material can include, for example: APP (acronym of atactic polypropylene) and/or SBS (acronym of styrene-butadiene-styrene) and/or polyolefins (for example APAO—amorphous poly alpha olefin and/or TPO—thermoplastic polyolefin) and/or styrene-butadiene-styrene (SBS) and/or styrene-ethylene-butadiene-styrene (SEBS) and/or resins or similar substances.

According to a preferred embodiment shown in FIGS. 1-5, the conveyor 1 comprises a preferably metal support frame 3 resting on the ground, which is provided with two beams 4. The beams 4 are spaced apart from each other and extend parallel to each other and to the feeding direction A of the rolls 2 on opposite sides with respect to the direction A. The beams 4 can comprise two substantially rectangular-shaped metal longitudinal members, which preferably extend straight, parallel to each other and form two side walls for containing the rolls 2.

The conveyor 1 further comprises two driving belts 5, which are adjacent to respective beams 4 and are wound in a loop about relative transmission and/or driving pulleys 6 pivoted on the beams 4. The conveyor 1 further comprises a plurality of crossbars 7 extending in a bridge-like manner between one driving belt 5 and the other at a preset distance along the feeding direction A, transverse to it, and have the opposite axial ends integral to the driving belts 5.

The conveyor 1 further comprises a plurality of belt-shaped transport portions 8, each of which extends between two consecutive crossbars 7 and is sized to form between two consecutive crossbars 7 a concave hammock-shaped transport cradle 9 designed to contain a roll 2.

The conveyor 1 further comprises a handling assembly 10, which is designed to rotate the pulleys 6 about the relative axes so as to advance the hammock-shaped transport cradles 9 along the feeding direction A to transport the rolls 2 from the loading station K1 to the unloading station K2.

According to a preferred exemplary embodiment shown in the enclosed figures, the conveyor 1 can comprise, for example: two twin driving belts 5 of a preferably toothed type, each of which winds in a loop three toothed wheels and/or pulleys 6. Two toothed wheels and/or pulleys 6 can be rotatably pivoted on the opposite axial ends of the inner face of the relative beam 4. The third toothed wheel or pulley 6 can be pivoted in a rotatable manner on a belt-tensioning member 16, centrally arranged in the beam 4, preferably below it. According to a preferred exemplary embodiment shown in the accompanying figures, the handling assembly 10 can comprise, for example, at least one electric motor 18 and a motion transmission unit 19, which mechanically connects the shaft of the electric motor to one or more pulleys 6 associated with the two belts 5 so as to transmit to these latter the motion generated by the shaft to make them rotate and thus make the hammock-shaped transport cradles 9 advance in the direction A.

The hammock-shaped transport cradle 9 can be shaped so as to extend below the two crossbars 7 in the upper branch portion of the conveyor 1, and is made of a flexible material. According to a preferred exemplary embodiment shown in FIGS. 1 to 6, the hammock-shaped transport cradle 9 can comprise a transport sheet 11 made of flexible material permanently connected to two respective consecutive crossbars 7. Preferably, the transport sheet 11 can conveniently have a reduced thickness, for example of the order of a few millimetres, and is structured to fit to the outer shape of the roll 2 when this latter is placed in the hammock-shaped transport cradle 9. Preferably, the transport sheet 11 can be approximately rectangular, and the two larger parallel and opposite sides 11a of the transport sheet 11 that are transverse to the feeding direction A are permanently connected to two respective consecutive crossbars 7. Preferably, the crossbars 7 can comprise approximately rectilinear metal rods, preferably having a circular cross-section, that are approximately parallel to each other and approximately transverse to the feeding direction A. Preferably, the transport sheet 11 can be made of a flexible and/or elastic material, e.g. rubber-based material or the like, whereas each crossbar 7 of a hammock-shaped transport cradle 9 can be arranged next to the crossbar 7 of a consecutive hammock-shaped transport cradle 9 and have the two axial ends rigidly/permanently fastened to the two belts 5.

It is clear that the transport sheets 11 can be independent of each other and therefore separated from one another. Alternatively, the transport sheets 11 can be connected to form a single belt that seamlessly extends between the opposite ends of the conveyor 1, thus forming a closed loop winding around the pulleys 6.

The distance between two consecutive crossbars 7 is preferably larger than the outer diameter of the roll 2. It is clear that the distance between two consecutive crossbars 7 can be varied according to the outer diameter of the roll 2. Preferably, the distance between the consecutive crossbars 7 can be comprised e.g. between about 150 mm and about 350 mm.

The width of the transport sheet 11 when it is spread out on a plane, measured between its two parallel larger sides 11a transversely to the feeding direction A, is preferably greater than the outer diameter of the roll 2 and, when fastened to the two crossbars 7, it is sized to form a semi-cylindrical recess for housing the roll 2. The width of the transport sheet 11 is sized so that, in use, when the roll 2 is placed in the hammock-shaped transport cradle 9, the transport sheet 11 fits below the roll 2 to at least partially wind around it. It is clear that the width of the transport sheet 11 can vary according to the outer diameter of the roll 2 and/or the size of the recess to be obtained in use in the hammock-shaped transport cradle 9 when it contains the roll 2. Preferably, the width of the transport sheet 11 can be comprised e.g. between about 300 mm and about 800 mm, preferably 612 mm.

According to an exemplary embodiment shown in the accompanying figures, the conveyor 1 comprises a configuration of two separate and spaced groups of hammock-shaped transport cradles 9. A first group can comprise four adjacent hammock-shaped transport cradles 9, arranged one after the other along the feeding direction A in the upper branch of the conveyor shown in FIG. 5. A second group can comprise five adjacent hammock-shaped transport cradles 9 in the lower branch of the conveyor shown in FIG. 5. In the example shown in FIG. 5, the two hammock-shaped transport cradles 9 arranged at the opposite ends of the first group are spaced apart from the corresponding hammock-shaped transport cradles 9 arranged at the opposite ends of the second group.

Figure 6:
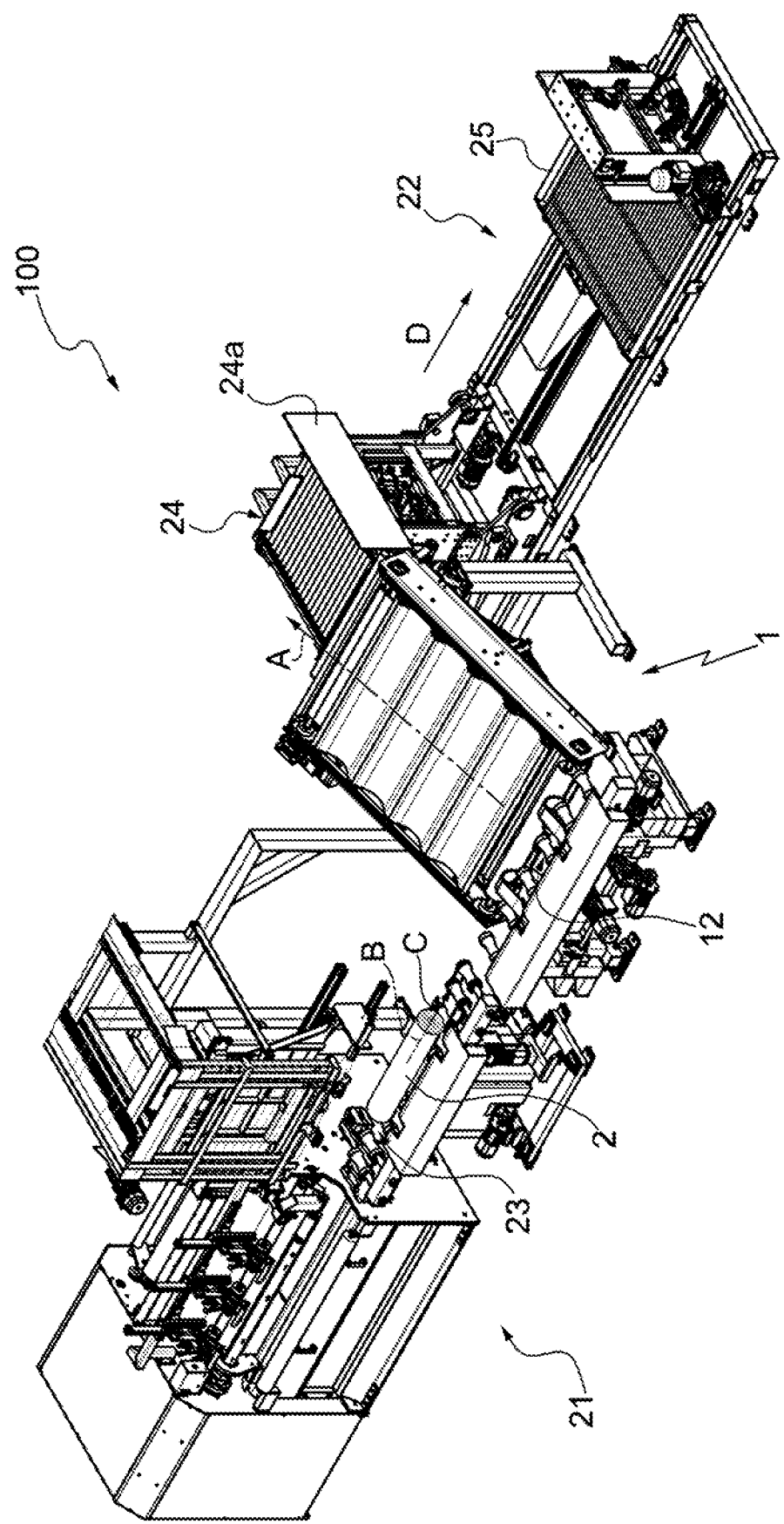
FIG. 6 shows a plant for making bituminous membrane rolls provided with a conveyor for transporting said rolls made according to the dictates of the present invention.

According to a possible exemplary embodiment shown in FIG. 6, the roll transporting conveyor 1 can be suitably included in a plant 100 for the production of rolls 2 and can be preferably arranged downstream of a roll forming station 21 and upstream of a roll palletization station 22. The roll forming station 21 is known and will therefore not be further described except to specify that, in the shown example, it is designed for: receiving a flat belt of flat bituminous membrane (not shown); rolling up the membrane belt to wind it around an axis B; preferably, but not necessarily, engaging a roll-holder tube in the central tubular space of the wound belt to form the roll 2; and feeding the finished roll 2 to the conveyor 1 along a direction C orthogonal to the feeding direction A.

For this purpose, the roll transporting conveyor 1 can conveniently comprise a roller conveyor 12 aligned with a roller conveyor 23 of the roll forming station 2. The rolls 2 can be arranged on the roller conveyor 23 with the axis B parallel to the feeding direction C. The rollers of the roller conveyor 23 can be motorized, e.g. they can be driven by electric motors, and their rotation can be controlled to advance each roll 2 along the direction C from the roll forming station 21 to the roller conveyor 12 on command.

The roller conveyor 12 can be formed by a plurality of rollers 12a mounted idly on a crossbar 13 of the support frame 3. In the example shown in the accompanying figures, the crossbar 13 is facing the loading station K1 of the roll transporting conveyor 1i, orthogonal to the axis A, whereas the rollers 12a of the roller conveyor 12 can be mounted on the inner face of the crossbar 13, one beside the other, along the direction C, thus showing the respective axes that are parallel to the axis A and lie on a preferably horizontal plane. In the shown example, the roller conveyor 12 is close to and above the first hammock-shaped transport cradle 9 at the end of the upper branch of the conveyor 1 during the rotation of the belts 5 and partially defining the loading station K1.

The roll transporting conveyor 1 can also be provided with thrusting elements 15, which are arranged at the roller conveyor 12 and can be operated to thrust the roll 2 into the roller conveyor 12 inside the first hammock-shaped transport cradle 9 adjacent to the roller conveyor 12. In the shown example, the thrusting elements can comprise S-shaped thrust flaps that are arranged between the rollers 12a, are hinged on one end of a base connected to the crossbar 13 and are designed to be rotated by motorized members, e.g. electric motors, about a horizontal axis parallel to the feeding direction C between a rest position and a thrust position. In the rest position, the thrust flaps are substantially horizontal below the rollers 12a and the roll 2 on the roller conveyor 12. In the loading position, at the end of the rotation the thrust flaps can be substantially vertical to lift partially the roll 2 from the roller conveyor 12 and move it towards the loading station K1 of the conveyor 1.

As regards instead the roll palletization station 22, it is known and will not therefore be further described except to specify that, according to one of the possible embodiments shown in FIG. 6, it can be designed for: receiving from the conveyor 1 a sequence of parallel rolls 2 arranged side by side in the hammock-shaped transport cradles 9 to unload them in a horizontal platform 24 adjacent to the unloading position of the conveyor 1, thus arranging them side by side and parallel to each other; rotating the platform 24 about a horizontal axis approximately orthogonal to the feeding direction A between the horizontal rest position (shown in FIG. 6) and an operative position in which the platform 24 is arranged approximately vertically, so that the rolls 2 are arranged side by side in vertical positions with a flat side face of the lower end of the roll 2 resting on a side support wall 24a of the platform 24; advancing the platform 24 with the vertical rolls 2 along a direction D orthogonal to the direction A towards an approximately horizontal palletization platform 25; unloading the vertical rolls 2 in the palletization platform 25 keeping them vertical so as to form a row of vertical rolls and rearranging the platform 24 in the horizontal rest position adjacent to the unloading position K2 of the conveyor 1 so as to receive from it a new sequence of rolls 2.

In the accompanying figures, the conveyor 1 is substantially inclined so that the feeding direction A forms an angle α with respect to a horizontal plane. The angle α can be about 20°. The conveyor 1 can have the loading station K1 at a height from the ground lower than the height from the ground of the unloading station K2. Preferably, the loading station K1 can be immediately beside and slightly below the roller conveyor 12. Preferably, the unloading station K2 can be immediately beside and slightly above the platform 24. Preferably, the conveyor 1 can be provided at the loading station K1 and at the unloading station K2 with respective rollers 14 and 17, transverse to the feeding direction A and having opposite ends connected to the pulleys 6 to be rotated about their axes by advancing the driving belts 5. The roller 14 can be facing on the one side the roller conveyor 12 and on the other side the first hammock-shaped transport cradle 9 in the upper branch of the conveyor 1. The roller 14 can receive the roll 2 from the thrusting elements 15 and can be rotated to thrust/load the roll 2 in turn into the first adjacent hammock-shaped transport cradle 9. The roller 17 can be arranged facing on the one side the platform 24 and on the other side the last hammock-shaped transport cradle 9 in the upper branch of the conveyor 1. The roller 17 can receive the roll 2 contained in the last hammock-shaped transport cradle 9 and can be rotated to push in turn the roll 2 into the adjacent platform 24.

The operation of the roll transporting conveyor 1 is as follows. In use, the conveyor 1 sequentially receives the rolls 2 in a row, one after the other, on the roller conveyor 12. When the roll 2 is on the roller conveyor 12, the thrusting elements 15 are actuated, and they overturn/unload it into the adjacent hammock-shaped transport cradle 9. The handling assembly 10 moves the hammock-shaped transport cradles 9 through the belts 5 along the direction A, thus moving the roll 2 between the loading position K1 and the unloading position K2 in which it is fed to the platform 24. It is clear that the control of the components of the plant, namely the operation of the thrusting elements, the advancement of the hammock-shaped transport cradles 9, the advancement speed of the hammock-shaped transport cradles 9, the rotation of the rollers 14 and 17, is suitably synchronized/set based on various parameters such as the number of the rolls 2, the number of the hammock-shaped transport cradles, the size of the rolls etc.

The hammock-shaped transport cradles are extremely advantageous because, thanks to their shape and to the flexibility of their material, they externally wind around the rolls 2, thus fitting on them without causing any ovalization.

Finally, it is clear that modifications and variations may be made to the conveyor and to the plant described and shown herein without thereby departing from the scope of the present invention defined by the appended claims.

The invention claimed is:

1. A roll transporting conveyor designed to transport bituminous membrane rolls along a feeding direction, wherein the roll transporting conveyor comprises:
   a support frame provided with two side beams spaced from one another and parallel to said feeding direction;
   two driving belts arranged at the respective side beams;
   a plurality of crossbars extending in a bridge-like manner between the driving belts at preset distances along said feeding direction and having their opposite axial ends integral to the driving belts;
   a plurality of belt-shaped transport portions, each of which extends between two consecutive crossbars and is sized so as to form, between the two consecutive crossbars, a hammock-shaped transport cradle having an approximately semi-circular shape designed to contain a roll; and
   the hammock-shaped transport cradle comprises a transport sheet made of elastic material firmly connected to the two consecutive crossbars.

2. The roll transporting conveyor according to claim 1, wherein the driving belts are wound in a loop about driving pulleys, and wherein the conveyor further comprises:
   a handling assembly that is designed to rotate the driving pulleys, thus moving forward each of the hammock-shaped transport cradles along the feeding direction to transport the rolls contained in the hammock-shaped transport cradles from a loading station of the rolls in the conveyor to an unloading station of the rolls from the conveyor.

3. The conveyor according to claim 1, wherein each of the hammock-shaped transport cradles is shaped so as to extend below the two consecutive crossbars in an upper branch of the conveyor and is made of a flexible material.

4. The conveyor according to claim 1, wherein each of the transport sheets is structured so as to adapt to the outer shape of the roll when the roll is arranged on the hammock-shaped transport cradle.

5. The conveyor according to claim 1, wherein each of the transport sheets is approximately rectangular and two parallel and opposite larger sides of the transport sheet, transverse to the feeding direction, are firmly connected to the two consecutive crossbars.

6. The conveyor according to claim 1, wherein said transport sheets are connected to one another so as to form a single belt seamlessly extending between the opposite ends of the conveyor so as to form a closed loop.

7. The conveyor according to claim 1, wherein said crossbars comprise approximately straight metal rods arranged approximately parallel to one another and approximately transverse to the feeding direction.

8. The conveyor according to claim 1, wherein said transport sheet is made of a rubber-based material.

9. The conveyor according to claim 1, wherein a distance between the consecutive crossbars is between about 150 mm and about 350 mm.

10. The conveyor according to claim 1, wherein a width of the transport sheet is between about 300 mm and about 800 mm.

11. A plant for manufacturing bituminous membrane rolls comprising: a roll forming station and a roll palletization station, said plant comprising a roll transporting conveyor designed to transport bituminous membrane rolls along a feeding direction between said roll forming station and said roll palletization station, said roll transporting conveyor comprises:
   a support frame provided with two side beams spaced from one another and parallel to said feeding direction,
   two driving belts arranged at the respective side beams,
   a plurality of crossbars extending in a bridge-like manner between the driving belts at preset distances along said feeding direction and having their opposite axial ends integral to the driving belts,
   a plurality of belt-shaped transport portions, each of which extends between two consecutive crossbars and is sized so as to form, between the two consecutive crossbars, a hammock-shaped transport cradle having an approximately semi-circular shape designed to contain a roll, and
   the hammock-shaped transport cradle comprises a transport sheet made of elastic material firmly connected to the two consecutive crossbars.

12. The plant according to claim 11, wherein the transport sheet is made of rubber-based material.

13. The plant according to claim 11 wherein, wherein a distance between the consecutive crossbars is between about 150 mm and about 350 mm.

14. The plant according to claim 11, wherein a width of the transport sheet is between about 300 mm and about 800 mm.

15. The plant according to claim 11, wherein said roll transporting conveyor comprise a roller conveyor formed by a plurality of rollers mounted idly on a crossbar of a support frame and configured to advance each of rolls, along a first direction orthogonal to said feeding direction from the roll forming station to the roller conveyor of said roll transporting conveyor.

16. The plant according to claim 15, wherein said roll transporting conveyor comprises thrusting elements, which are arranged at the roller conveyor and are configured to operate to thrust the roll into the roller conveyor inside the first hammock-shaped transport cradle adjacent to the roller conveyor.

17. The plant according to claim 16, wherein said thrusting elements comprise S-shaped thrust flaps that are arranged between said rollers, are hinged on one end of a base connected to said crossbar and are designed to be rotated by motorized members, about a horizontal axis parallel to the first direction between a rest position and a thrust position.

18. The plant according to claim 17, wherein in rest position, the thrust flaps are substantially horizontal below the rollers and the roll on the roller conveyor and in the loading position, at the end of the rotation the thrust flaps is substantially vertical to lift partially the roll from the roller conveyor and move the roll towards a loading station of the roll transporting conveyor.

* * * * *